United States Patent [19]

Higaki et al.

[11] Patent Number: 5,509,498

[45] Date of Patent: Apr. 23, 1996

[54] CABLE SUPPORT FOR WORKMEN ON ROOFS

[76] Inventors: Sumiko Higaki, 3209 Adelaide Way, Belmont, Calif. 94002; Tadashi Nakazawa, 455 Santiago Ave., El Granada, Calif. 94018; Melchor Bacani, 567 Heathcliff Dr., Pacifica, Calif. 94044

[21] Appl. No.: 357,339

[22] Filed: Dec. 16, 1994

[51] Int. Cl.⁶ .................................................. E04H 17/00
[52] U.S. Cl. ..................... 182/45; 182/3; 256/1
[58] Field of Search .................. 182/45, 3, 113; 256/DIG. 6, 46, 1, 32

[56] References Cited

U.S. PATENT DOCUMENTS

| | | | |
|---|---|---|---|
| 331,489 | 12/1889 | Fuller | 182/113 |
| 2,871,914 | 2/1959 | Timoney | 182/113 X |
| 3,237,717 | 3/1966 | Jackson | 182/45 X |
| 3,880,405 | 4/1975 | Brueske | 248/237 X |
| 5,409,195 | 4/1995 | Strickland | 182/3 X |

FOREIGN PATENT DOCUMENTS 4-102668  4/1992  Japan ................................. 182/113

*Primary Examiner*—Alvin C. Chin-Shue
*Attorney, Agent, or Firm*—Julian Caplan; Flehr, Hohbach, Test, Albritton & Herbert

[57] ABSTRACT

Workmen are required to spray whitewash on sloping glass roofs such as used in greenhouses at certain seasons and then to scrub the whitewash off the glass later on. Ordinarily workmen support themselves on the narrow gutter alongside the roof or between roofs. According to the invention, brackets are installed at each end of the gutter and, if the roof is long, intermediate the ends. Two cables are supported by each set of brackets. The workman wears a safety belt from which extend two short ropes having snap books to be attached to the cables.

12 Claims, 3 Drawing Sheets

CABLE SUPPORT FOR WORKMEN ON ROOFS

BACKGROUND OF THE INVENTION

1. Field of the Invention

This invention relates to a new and improved cable support for workmen working on roofs of buildings such as greenhouses. It enables the workman to support himself on the narrow gutter alongside the glass roof when performing tasks such as spraying the glass with whitewash or scrubbing the whitewash from the glass.

2. Description of Related Art

The tasks of spraying white wash and subsequently scrubbing it from glass roofs have been conducted without support for workmen. It is difficult for the workman to maintain balance on the gutter. The present invention provides cable supports for the workman to retain his balance.

SUMMARY OF THE INVENTION

At certain seasons of the year, it is desirable to spray whitewash or paint on the glass panels of the sloping roofs of greenhouses to reduce excessive sunlight which may damage the plants in the greenhouse. Later, the white wash is removed by brushing the glass with long handled brushes. During these operations the workmen are perched on the narrow gutters which run alongside the end of the greenhouse or between adjacent sloping roofs. The present invention provides cables to which safety belts worn by the workmen may be attached to aid in maintaining balance.

A bracket is installed at each end of each gutter. The bracket has laterally spaced upper ends to which cables are attached, the opposite ends of the cables being attached to a similar bracket at the opposite end of the building.

Use of the present invention enables the workman to maintain balance, reduces the amount of exertion required in performing the required tasks, reduces any tendency for the workman to lose his balance and thereby be injured and reduces likelihood of glass breakage.

BRIEF DESCRIPTION OF THE DRAWINGS

The accompanying drawings, which are incorporated in and form a part of this specification, illustrate embodiments of the invention and, together with the description, serve to explains the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
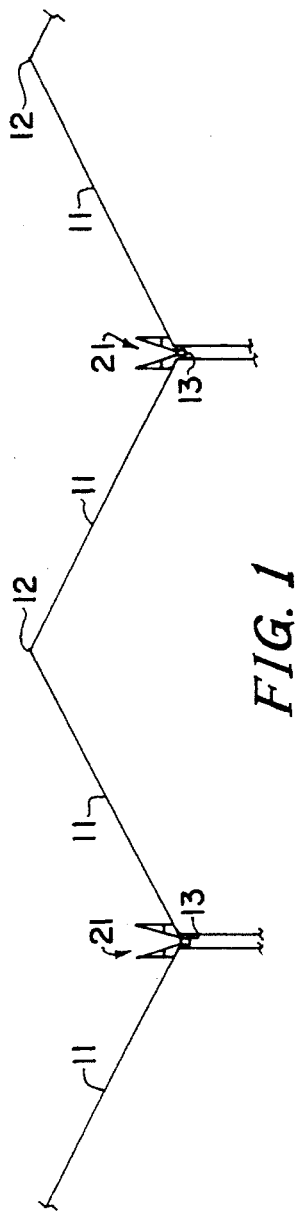
FIG. 1 is a schematic end elevational view of a portion of a greenhouse.
Figure 2:
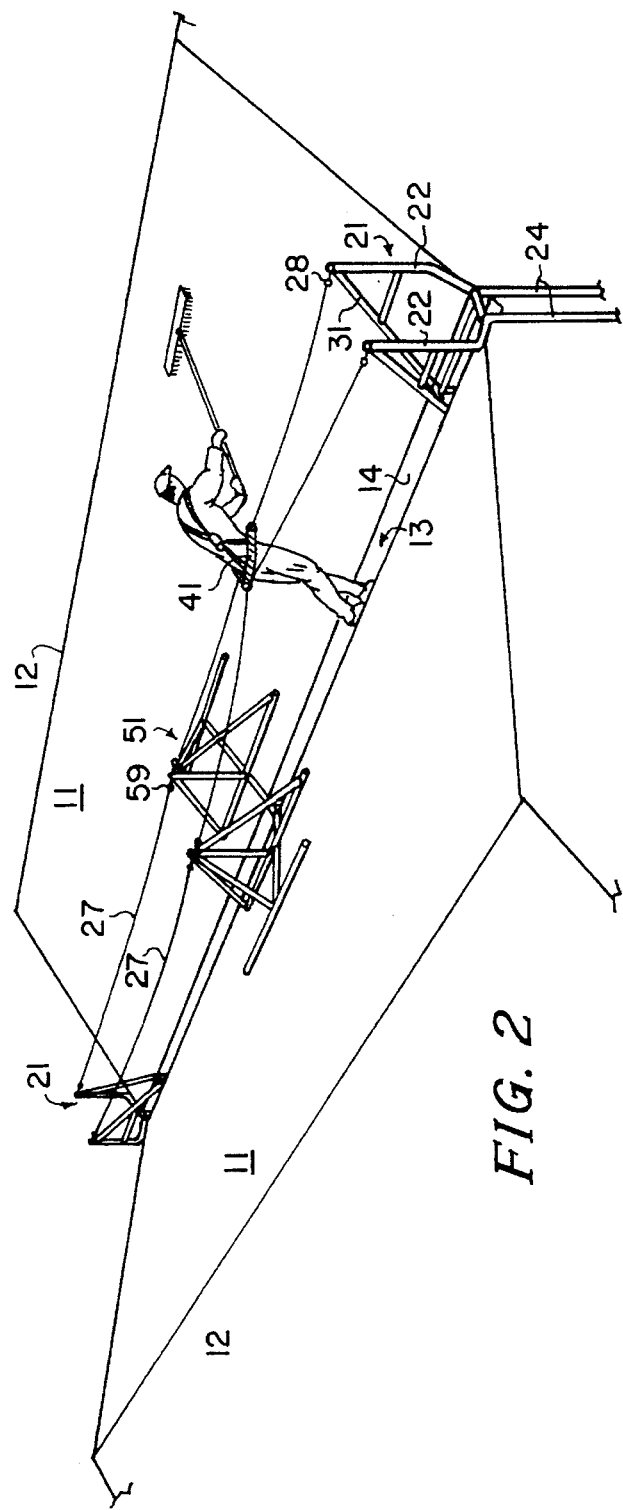
FIG. 2 is a schematic view showing a workman supported by the cables of the present invention.
Figure 3:
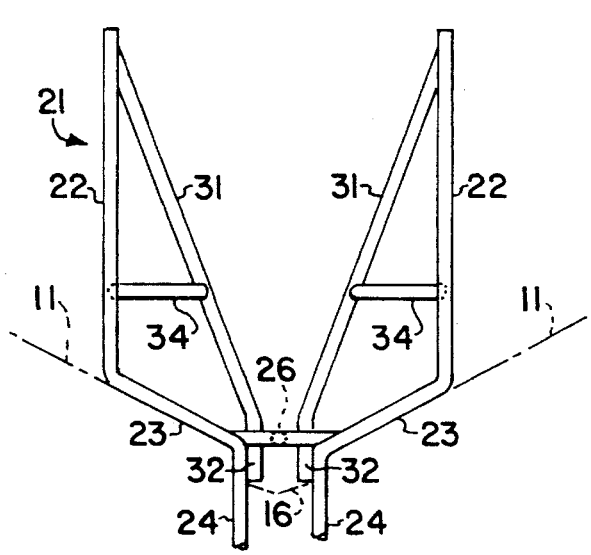
FIG. 3 is an enlarged front elevational view of a bracket used to support cables, being partly broken away to conserve space.
Figure 4:
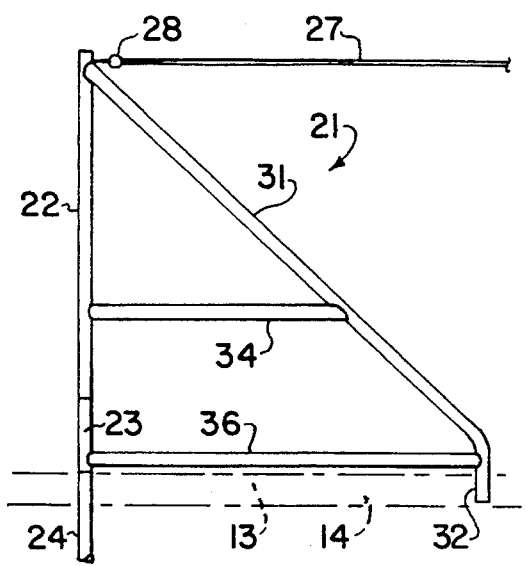
FIG. 4 is a side elevational view of the structure of FIG. 2 showing a portion of a cable attached.

FIGS. 1 and 2 show a portion of a greenhouse as viewed from one end including sloping roof sides 11 which are made up of numerous panels of glass (not shown) as well understood in the art. In preferred construction, two sloping sides 11 are connected together at a top edge 12. A gutter 13 is installed either where the sloping sides 11 converge or, at the side of the building. The distances between gutters 13 are large –i.e., approximately 42 feet. Gutters 13 are narrow, being formed preferably with vertical sides 14 having a converging sloped angled bottom 16. It is customary for a workman to support himself on the gutter 13 as he moves from one end of the building to the other holding a long nozzle which sprays whitewash on the sides 11 and, at a later season of the year, manipulating a long handled brush to scrub the whitewash off the roof.

According to the present invention, a bracket 21 is attached in the gutter 13 and to the side wall of the building at each end of each gutter. The bracket comprises a pair of vertical members 22 which are laterally spaced apart about 30 inches, the lower ends of the members 22 being slanted inwardly downwardly in midportions 23 which are parallel to and rest on the sloping sides 11 of the building. Midportions 23 are bent vertically downwardly in lower vertical members 24 on either side of the gutter 13 and the inner sections of midportions 23 and lower vertical portions 24 are interconnected by horizontal cross brace 26. Lower vertical members are securely fastened to the sides of the building by any convenient fastening means (not shown). A pair of horizontal cables 27 extends from eyes 28 attached to the upper ends of members 22 to corresponding eyes on the bracket at the opposite end of the building. Thus the cables are held taut and are spaced apart about 30 inches at a height approximately equal to the height of the belt of the workman.

Figure 5:
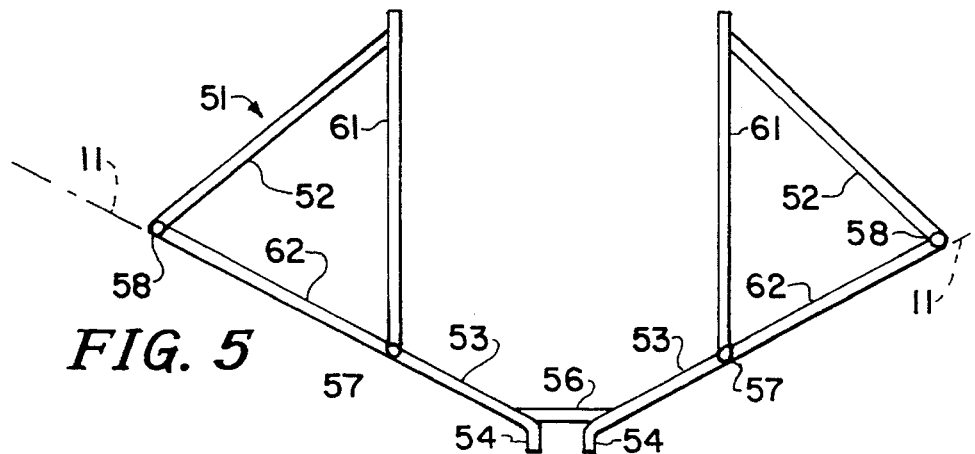
FIG. 5 is a view similar to FIG. 3 of an intermediate bracket.
Figure 6:
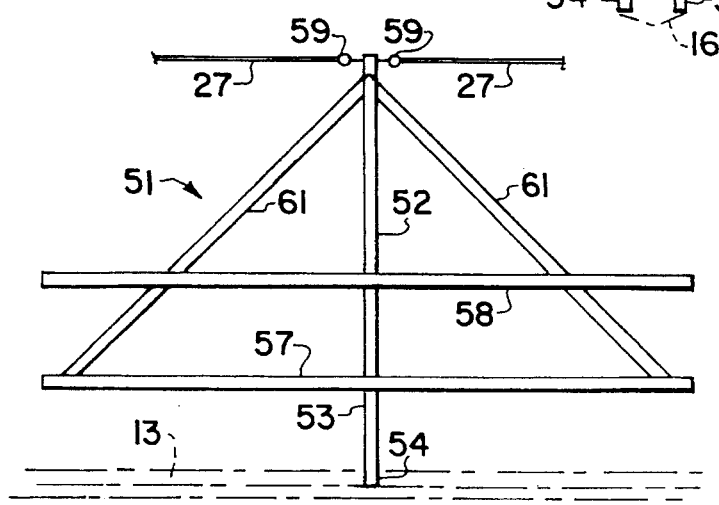
FIG. 6 is a side elevational view of the structure of FIG. 5.

To further support the members 22 upright, the upper end of each is connected to a downward inward and rearward slanted brace 31, the lower end of which is bent in a vertical downward foot 32 which fits inside the vertical sides 14 of the gutter spaced at the rear of the bracket. For further support, an intermediate horizontal tie 34 is connected at one end to vertical member 22 and at the opposite end to brace 31. A horizontal bottom tie 36 is connected at one end to slanted midportion 23 and at its opposite end to the upper end of foot 32 of brace 31. Members 31, 34 and 36 rest on roof side 11.

Where cables 27 are long, an intermediate bracket 51 shown in FIGS. 5 and 6 may be used. Bracket 51 comprises a pair of spaced vertical members 52, the upper ends of which carry opposed eyes 59 to which ends of cables 27 may be connected. The lower end of member 52 is bent inwardly downwardly parallel to the slope of roof side 11 in a slanted mid-portion 53 which terminates in a vertical downward extending foot 54 which fits inside the sides 14 of gutter 13. The lower ends of mid-portions 53 are interconnected by horizontal cross brace 56.

To further support the vertical members 52, a bottom longitudinal member 57 extends longitudinally parallel to cable 27, resting on side 11. A pair of upper slanted connectors 61 are fastened adjacent upper ends of vertical member 52 and at their lower ends are connected to a longitudinal member 58, which also extends parallel to cables 27 and rests on side 11. A pair of lower slanted connectors 62 are connected to an immediate longitudinal member 58 and lower longitudinal member 57. The cross bracing of intermediate bracket 51 provides support for cables 27 even though it does not have the advantage of the long lower vertical members 24 of bracket 21 being attached to the side of the building.

Figure 7:
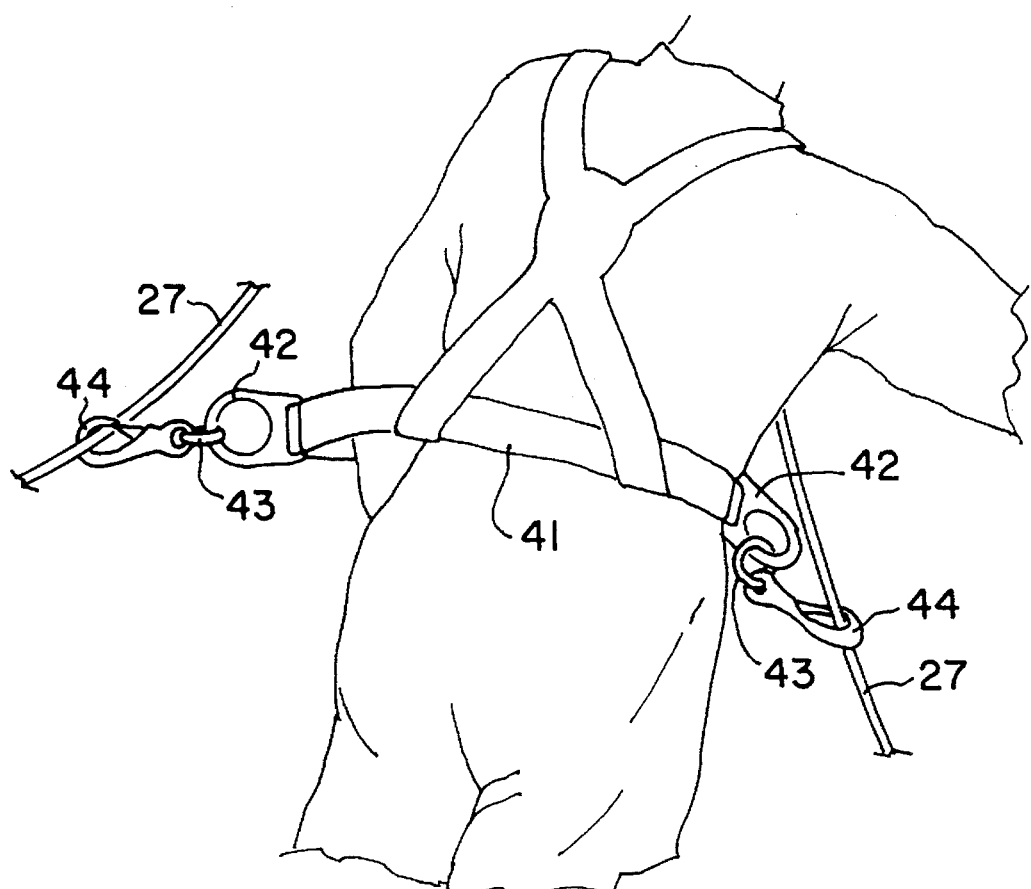
FIG. 7 is an enlarged view of the attachment of the belt to the cables.

The workman perched on the gutter 13 wears a commercially available lineman's belt 41 which has D-rings 42 on either side. As shown in FIG. 7, lines 43 carrying snap hooks 44 attached at its inner end to a D-ting 42 and at its outer end to cable 27. This provides support for the workman as he moves along the gutter 13 manipulating a spray nozzle or a long handled brush, as the occasion may require.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A support for a workman walking on a narrow building walkway extending longitudinally along the bottom edge of a slanted roof of a building comprising
   a first bracket at a first end of said walkway, a second bracket at a second end of said walk:Nay opposite said first end, means for fixing said first bracket to a first end of said building, means for fixing said second bracket to a second end of said building,
   each said bracket having vertical, laterally spaced upright first and second members on opposite sides of said walkway and extending above said walkway,
   a first cable attached to the upper end of a first member of said first bracket and the upper end of a first member of said second bracket and a second cable attached to the upper end of a second member of said first bracket and the upper end of a second member of said second bracket,
   each said bracket comprising midportions at the lower ends of said members slanted parallel to said roof and extending toward said walkway and lower vertical members at the inner ends of said midportions extending down along an end of said building, said lower vertical members comprising said means for fixing said bracket.

2. A support according to claim 1 wherein said cables extend parallel to each other at waist height to a workman standing on said walkway and in which said support further comprises a belt adapted to be worn by a workman, first and second short rope-like members attached to said belt, each said rope-like member having means fitting onto one said cable for sliding movement along said cable as said workman walks along said walkway.

3. A support according to claim 2 wherein said first and second members and said first and second cables are spaced apart so that a workman can walk therebetween.

4. A support according to claim 1 which further comprises an intermediate bracket having third and fourth vertical, laterally spaced upright members on opposite sides of said walkway, and feet on said intermediate bracket engaging said support and braces adapted to rest on said, slanted roof side,
   said first cable being attached to said third member and said second cable being attached to said fourth member.

5. A support according to claim 1 which further comprises for each said vertical member an inward rearward slanted brace extending from adjacent the upper end of said vertical member to adjacent said walkway and a foot at the lower end of said brace adapted to engage said walkway.

6. A support according to claim 5 which further comprises a substantially horizontal bottom tie positioned to extend along said walkway connected at one end to said slanted midportion and at its other end to said slanted brace.

7. A support according to claim 6 which further comprises a substantially horizontal intermediate tie spaced above said bottom tie connected at one end to said vertical member and at its opposite end to said brace.

8. A support according to claim 4 in which said intermediate bracket further comprises a substantially horizontal cross-brace connected to each of said midportions.

9. A support according to claim 4 wherein said intermediate bracket further comprises a slanted midportion at the lower end of said vertical member extending downward parallel to and adapted to rest on said slanted roof and a foot at the lower end of said slanted midportion adapted to engage said walkway.

10. A support according to claim 9 in which said intermediate bracket further comprises a substantially horizontal longitudinal member connected to the lower end of said vertical member and adapted to rest on said roof.

11. A support according to claim 10 in which said intermediate bracket further comprises a slanted member extending upward of said roof in a direction away from said walkway, a second intermediate, substantially horizontal member adapted to rest on said roof connected to the outer end of said slanted member, and a connector connected at one end adjacent the upper end of said vertical member and at an opposite end to said second horizontal member at a point spaced from said vertical member.

12. A support according to claim 9 in which said intermediate bracket further comprises a substantially horizontal cross brace connecting the lower ends of said slanted midportions.

* * * * *